(12) United States Patent
Shapiro et al.

(10) Patent No.: US 9,548,618 B2
(45) Date of Patent: Jan. 17, 2017

(54) HEATED INSOLES

(71) Applicant: Schawbel Technologies LLC, Burlington, MA (US)

(72) Inventors: Stephen Shapiro, Bedford, MA (US); James K. Lynch, Bedford, MA (US); Ian Nicholson Whitehead, Bedford, MA (US)

(73) Assignee: Schawbel Technologies LLC, Burlington, MA (US)

( * ) Notice: Subject to any disclaimer, the term of this patent is extended or adjusted under 35 U.S.C. 154(b) by 416 days.

(21) Appl. No.: 13/728,336

(22) Filed: Dec. 27, 2012

(65) Prior Publication Data

US 2013/0181662 A1    Jul. 18, 2013

Related U.S. Application Data

(60) Provisional application No. 61/594,043, filed on Feb. 2, 2012, provisional application No. 61/581,782, filed on Dec. 30, 2011.

(51) Int. Cl.
*H02J 7/00* (2006.01)
*A43B 3/00* (2006.01)

(52) U.S. Cl.
CPC ........... *H02J 7/0052* (2013.01); *A43B 3/0005* (2013.01)

(58) Field of Classification Search
CPC ........... A43B 7/02; A43B 7/04; A43B 3/0005; A43B 7/025; A43B 3/0015; A43B 17/00; A43B 7/005; A43B 7/34; A43B 13/38; A43B 13/182; A43B 17/08; A43B 1/0054; A43B 21/26; A43B 7/081; A43B 7/12; A43B 7/144; H05B 2203/036; H05B 2203/014; H05B 2203/017; H05B 3/34; H05B 1/0227; H05B 2203/003; H05B 2203/013; H05B 2203/035; H05B 3/02; H05B 3/342; H05B 3/36; A41D 19/01535; A61F 2007/0201; A61F 7/007; A61H 35/006; H02J 7/32; H02J 7/0052; A63H 3/003

See application file for complete search history.

(56) References Cited

U.S. PATENT DOCUMENTS

| 2,680,918 A | 6/1952 | Behner |
| 3,360,633 A | 12/1967 | Weisberger |
| 3,585,736 A | 6/1971 | Polichena |

(Continued)

FOREIGN PATENT DOCUMENTS

| CN | 2281677 | 5/1998 |
| CN | 2515992 Y | 10/2002 |

(Continued)

OTHER PUBLICATIONS

International Search Report and Written Opinion mailed on Sep. 3, 2014, for International Patent Application No. PCT/US2014/033499, filed Apr. 9, 2014, (10 pages).

(Continued)

*Primary Examiner* — Nha Nguyen
(74) *Attorney, Agent, or Firm* — Brown Rudnick LLP

(57) ABSTRACT

An efficient system to heat the insole of a heated insole of a shoe in which the Intelligent Circuit (IC) for a flat lithium battery is located outside the shoe and the placement of the heater for the insole is between more efficient heat insulation and heat conducting members.

14 Claims, 4 Drawing Sheets

(56) References Cited

U.S. PATENT DOCUMENTS

| | | |
|---|---|---|
| 3,621,191 A | 11/1971 | Cornwell |
| 3,800,133 A | 3/1974 | Duval |
| 4,470,263 A | 9/1984 | Lehovec et al. |
| 4,507,877 A | 4/1985 | Vaccari et al. |
| 4,665,301 A | 5/1987 | Bondy |
| 4,823,482 A | 4/1989 | Lakic |
| D303,524 S | 9/1989 | Siegner et al. |
| 4,894,931 A | 1/1990 | Senee et al. |
| 4,910,881 A | 3/1990 | Baggio et al. |
| 5,041,717 A | 8/1991 | Shay, III et al. |
| D320,212 S | 9/1991 | Someya |
| 5,230,170 A | 7/1993 | Dahle |
| 5,483,759 A | 1/1996 | Silverman |
| 5,495,682 A | 3/1996 | Chen |
| 5,565,124 A | 10/1996 | Balzano |
| 5,592,759 A | 1/1997 | Cox |
| 5,623,772 A | 4/1997 | Sunderland et al. |
| 5,800,490 A | 9/1998 | Patz et al. |
| 5,802,865 A | 9/1998 | Strauss |
| 5,830,208 A | 11/1998 | Muller |
| 5,875,571 A | 3/1999 | Huang |
| 5,882,106 A | 3/1999 | Galli |
| 5,956,866 A | 9/1999 | Spears |
| 5,970,718 A | 10/1999 | Arnold |
| 6,074,414 A | 6/2000 | Haas et al. |
| 6,094,844 A | 8/2000 | Potts |
| D432,493 S | 10/2000 | Killebrew et al. |
| 6,125,636 A | 10/2000 | Taylor et al. |
| 6,189,327 B1 | 2/2001 | Strauss et al. |
| D440,201 S | 4/2001 | Huynh et al. |
| 6,320,161 B1 | 11/2001 | Hansen, Jr. |
| 6,523,836 B1 | 2/2003 | Chang et al. |
| 6,649,873 B1 | 11/2003 | Cintron, Jr. et al. |
| 6,657,164 B1 | 12/2003 | Koch |
| D486,789 S | 2/2004 | Santiago |
| 6,701,639 B2 | 3/2004 | Treptow et al. |
| 6,770,848 B2 | 8/2004 | Haas et al. |
| 6,840,955 B2 | 1/2005 | Ein |
| 6,841,757 B2 | 1/2005 | Marega et al. |
| 6,865,825 B2 | 3/2005 | Bailey, Sr. et al. |
| 7,022,093 B2 | 4/2006 | Smith et al. |
| D528,075 S | 9/2006 | Sugeno et al. |
| D533,832 S | 12/2006 | Hock |
| 7,152,345 B2 | 12/2006 | Koenig |
| D538,225 S | 3/2007 | Lyman et al. |
| D538,226 S | 3/2007 | Lyman et al. |
| D546,277 S | 7/2007 | Andre et al. |
| 7,244,253 B2 | 7/2007 | Neev |
| D552,081 S | 10/2007 | Yano |
| 7,497,037 B2 | 3/2009 | Vick et al. |
| 7,565,754 B1* | 7/2009 | Acheson et al. ............ 36/28 |
| D602,432 S | 10/2009 | Moussa |
| D609,180 S | 2/2010 | Suzuki et al. |
| 7,714,709 B1 | 5/2010 | Daniel |
| 7,716,856 B2 | 5/2010 | Seipel |
| 7,726,046 B2 | 6/2010 | Portnell |
| 7,823,302 B2 | 11/2010 | Mann et al. |
| D637,552 S | 5/2011 | Inman et al. |
| 7,985,502 B2 | 7/2011 | Abe et al. |
| D642,517 S | 8/2011 | Inman et al. |
| 8,074,373 B2 | 12/2011 | Macher et al. |
| 8,084,722 B2 | 12/2011 | Haas et al. |
| D654,429 S | 2/2012 | Li et al. |
| D660,798 S | 5/2012 | Tseng |
| 8,384,551 B2 | 2/2013 | Ross et al. |
| 8,397,518 B1 | 3/2013 | Vistakula |
| D682,195 S | 5/2013 | Aglassinger |
| D685,729 S | 7/2013 | Lyman |
| D686,157 S | 7/2013 | Kawase et al. |
| 8,510,969 B2 | 8/2013 | Luo |
| D689,019 S | 9/2013 | Sato et al. |
| D694,176 S | 11/2013 | Buetow et al. |
| D698,313 S | 1/2014 | Buetow et al. |
| 8,638,958 B2 | 1/2014 | Wells |
| D699,178 S | 2/2014 | Ashida et al. |
| D699,179 S | 2/2014 | Alexander |
| D700,135 S | 2/2014 | Sato et al. |
| 8,658,943 B1 | 2/2014 | Larsen et al. |
| 8,715,329 B2 | 5/2014 | Robinson et al. |
| 8,777,441 B2 | 7/2014 | Vazquez |
| 8,850,716 B2 | 10/2014 | Whitehead et al. |
| 8,869,428 B1 | 10/2014 | Zsolcsak et al. |
| 8,869,429 B1 | 10/2014 | Zsolcsak et al. |
| 9,101,177 B2 | 8/2015 | Whitehead et al. |
| 2003/0114902 A1 | 6/2003 | Prescott |
| 2003/0145494 A1 | 8/2003 | Hsu |
| 2004/0210214 A1 | 10/2004 | Knowlton |
| 2004/0211189 A1 | 10/2004 | Arnold |
| 2005/0028401 A1 | 2/2005 | Johnson |
| 2005/0126049 A1 | 6/2005 | Koenig |
| 2005/0193742 A1 | 9/2005 | Arnold |
| 2006/0174521 A1 | 8/2006 | Lee |
| 2006/0230641 A1 | 10/2006 | Vick et al. |
| 2006/0283050 A1 | 12/2006 | Carnes et al. |
| 2007/0039201 A1 | 2/2007 | Axinte |
| 2007/0053212 A1* | 3/2007 | Vieira Formenti ....... H02J 7/04 363/21.01 |
| 2008/0016715 A1 | 1/2008 | Vickroy |
| 2008/0069524 A1 | 3/2008 | Yamauchi et al. |
| 2008/0077211 A1 | 3/2008 | Levinson et al. |
| 2008/0083720 A1 | 4/2008 | Gentile et al. |
| 2008/0197126 A1 | 8/2008 | Bourke et al. |
| 2009/0013554 A1 | 1/2009 | Macher et al. |
| 2010/0192406 A1* | 8/2010 | Au ................... 36/2.6 |
| 2010/0198322 A1 | 8/2010 | Joseph et al. |
| 2011/0083339 A1 | 4/2011 | Luo |
| 2011/0107771 A1 | 5/2011 | Crist et al. |
| 2011/0296714 A1 | 12/2011 | Holzer |
| 2011/0306299 A1 | 12/2011 | Wells |
| 2012/0005919 A1 | 1/2012 | Chen |
| 2013/0019503 A1 | 1/2013 | Vogt |
| 2013/0085421 A1 | 4/2013 | Gillespie et al. |
| 2013/0116759 A1 | 5/2013 | Levinson et al. |
| 2013/0174451 A1 | 7/2013 | Kremer et al. |
| 2013/0181662 A1 | 7/2013 | Shapiro |
| 2013/0213147 A1 | 8/2013 | Rice et al. |
| 2013/0244074 A1 | 9/2013 | Kremer et al. |
| 2014/0059894 A1 | 3/2014 | Lupinek et al. |
| 2014/0182163 A1 | 7/2014 | Krupenkin et al. |
| 2014/0222173 A1 | 8/2014 | Giedwoyn et al. |
| 2014/0277632 A1 | 9/2014 | Walker |

FOREIGN PATENT DOCUMENTS

| | | |
|---|---|---|
| CN | 101641027 A | 2/2010 |
| CN | 201976877 U | 9/2011 |
| DE | 20317143 U1 | 4/2004 |
| DE | 10352050 A1 | 12/2004 |
| DE | 102008029727 A1 | 12/2009 |
| EP | 0251084 A2 | 1/1988 |
| EP | 0854696 B1 | 7/1998 |
| EP | 2215918 A2 | 8/2010 |
| KR | 20-0273770 | 4/2002 |
| KR | 2009-0117205 A | 11/2009 |
| WO | 2006/111823 A1 | 10/2006 |
| WO | 2008/006731 A1 | 1/2008 |
| WO | 2008/069254 A1 | 6/2008 |
| WO | 2008/069524 A1 | 6/2008 |
| WO | 2011057142 A2 | 5/2011 |
| WO | 2013/101920 A1 | 7/2013 |
| WO | 2014064518 A2 | 5/2014 |

OTHER PUBLICATIONS

International Search Report and Written Opinion for International application No. PCT/US12/23986 filed Feb. 2, 2012 and mailed on May 23, 2012, (7 pages).

International Search Report and Written Opinion mailed on Apr. 22, 2013, for International Patent Application No. PCT/US2012/071797, filed Dec. 27, 2012, (9 pages).

Kenisarin et al., 2007, Solar energy storage using phase change materials, Renewable and Sustainable Energy Reviews, 11(9):1913-1965.

(56) References Cited

OTHER PUBLICATIONS

Sharma et al., 2009, Review on thermal energy storage with phase change materials and applications, Renewable and Sustainable Energy Reviews, 13(2):318-345.
International Search Report and Written Opinion for International Application NO. PCT/US2012/038801 Mailed Oct. 6, 2015 (14 Pages).
International Search Report and Written Opinion for International application No. PCT/US2014/072718 filed Dec. 30, 2014 and mailed on Apr. 28, 2015, (10 pages).

* cited by examiner

HEATED INSOLES

RELATED APPLICATIONS

This application is based upon two U.S. Provisional Patent Applications, Ser. Nos. 61/581,782, filed Dec. 30, 2011 and 61/594,043, filed Feb. 2, 2012, the priority of which are claimed and the contents of which are incorporated herein.

DESCRIPTION AND BACKGROUND OF THE INVENTION

This invention relates to improvements for heated insoles for shoe wear, especially for hiking, cycling and skiing and even for ordinary shoes if the wearer has cold feet.

Over the years, various systems have been designed and employed to provide additional heat inside shoes when they are used in outdoor environments. An example of such a prior art system is shown in US Patent Publication US2009/0013554, which is directed to a wireless system in which signals are transmitted to control a heater in the insole.

For some time, there have been fixed hardwired systems such as shown in U.S. Pat. No. 4,665,301 in which heaters are plugged into a wall socket to provide heat to the insole which is used during the day. It may be recharged through a suitable recharging system to reheat the heated insole to provide sufficient warmth to the user.

These systems generally have an electric heater placed on the bottom of the insole with various nonconductive foam materials therein. Current designs, while conventional, are limited in that a good portion of the heat is not provided to the upper portion of the sole, which is in closer contact with the foot of the wearer.

Lithium ion batteries which are flat have been incorporated as the batteries to provide power for the insole, and opposed to having battery power outside the boot as was previously provided for heating the insole.

Lithium ion battery chargers are generally formed of two sections:
 A power supply that converts line AC into low voltage DC; and
 An intelligent circuit (IC) that receives the low voltage DC, monitors the battery charge state, and delivers suitable current and voltage to fully and safely charge the batteries for heating the heating pad and the insole.

Heretofore insoles with built in lithium ion batteries have the charger power supply as a wall mounted device and the intelligent charging circuit located inside the insole. This arrangement subjects the charging components to the heat and mechanical stress of use when the footwear is worn. Any failure of a charging component renders the entire product useless.

An object of this invention is to provide an improved heating system for insoles for shoes.

Another object of this invention is to more efficiently provide heat to the wearer during normal usage.

Another object of this invention is to provide an improved lithium battery system in which the intelligent circuit component is located outside the shoe.

Yet another object of this invention is to provide a more efficient, economical system for heating insoles.

Another object of this invention is to more efficiently locate the heater within an insole to more directly provide heat to the foot of the wearer.

Yet another object of this invention is to provide a more efficient and economical battery charging system more susceptible of widespread use.

Other objects, advantages and features of this invention will become more apparent from the following description.

In accordance with the principles of this invention, the above objects are accomplished by separating the intelligent circuit (IC) which charges the rechargeable lithium batteries from the lithium ion batteries itself. This may be accomplished by locating the IC charging circuit within the AD/DC plug adapter assembly or having the IC charging circuit assembly as a module closely located and connected to the AC/DC converter.

Since the IC is a relatively expensive part of the lithium battery assembly, removing it from the physical wear and tear conventionally encountered and integrally formed with the battery to be charged enables a costly component to prolong its life, reduce the possibility of failure and ensure that only the lithium battery is replaced when necessary without the need to replace the entirety of the Intelligent Circuit (IC) lithium battery combination.

Further, the above objects are accomplished by additionally relocating the heater within the insole from the substantially bottom most location furthest from the foot of the user to a location closer to the foot of the user so as to provide more efficient heat directed to the user, thereby reducing power drain and more efficiently and quickly heating the area. Prior art insoles have an EVA foam layer of about 5 mm thickness located above the heater. The new structure compresses the EVA foam to no more than 2 or 3 mm, then adds an additional conductive layer above the battery and an additional insulating layer between the foot and bottom of the shoe to improve heat conductivity to the foot of the wearer.

These improvements are described below in greater detail with reference to the following drawings.

DETAILED DESCRIPTION OF THE PREFERRED EMBODIMENT

Figure 1:
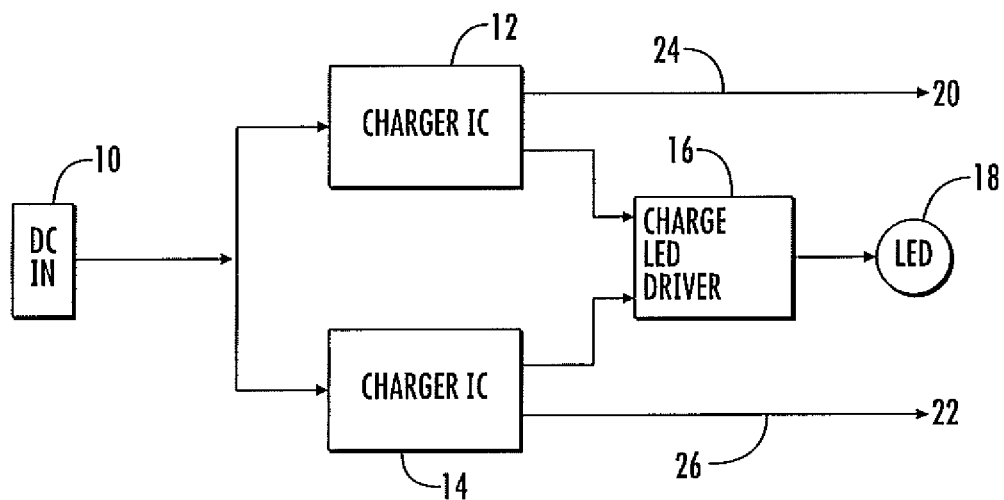
FIG. 1 is a block diagram of the intelligent circuit (IC) elements located outside of the lithium battery located within the sole.

FIG. 1 is a block diagram of this invention with the AC to DC converter merely indicated as DC in block 10. Such AC to DC converter is plugged into a 120 volt wall socket or any other suitable AC wall socket to provide a DC output. The output of the DC converter 10 is supplied to charger intelligent circuits (IC) 12 and 14 which include the ability to receive the low DC voltage produced by converter 10, monitor the battery charge state and deliver suitable current and voltage to fully and safely charge the batteries. A charge LED driver 16 is provided to light an LED 18 as the batteries are being charged. The output of the charger intelligent circuits 12 and 14 are supplied to batteries 20 and 22 respectively, which are separately located within the insole.

Batteries 20 and 22 are located within the insoles, and two batteries are provided for the pair of insoles for the pair of shoes. Cables or conductors 24 and 26, respectively, are provided as outputs of the IC circuits terminating in standard plugs for receptacles contained within the shoes to be heated. The IC circuits 12 and 14, LED driver 16 and LED 18 may all be contained within a single housing directly connected to the AC to DC converter 10 or integrally formed within AC to DC converter 10.

Figure 2:
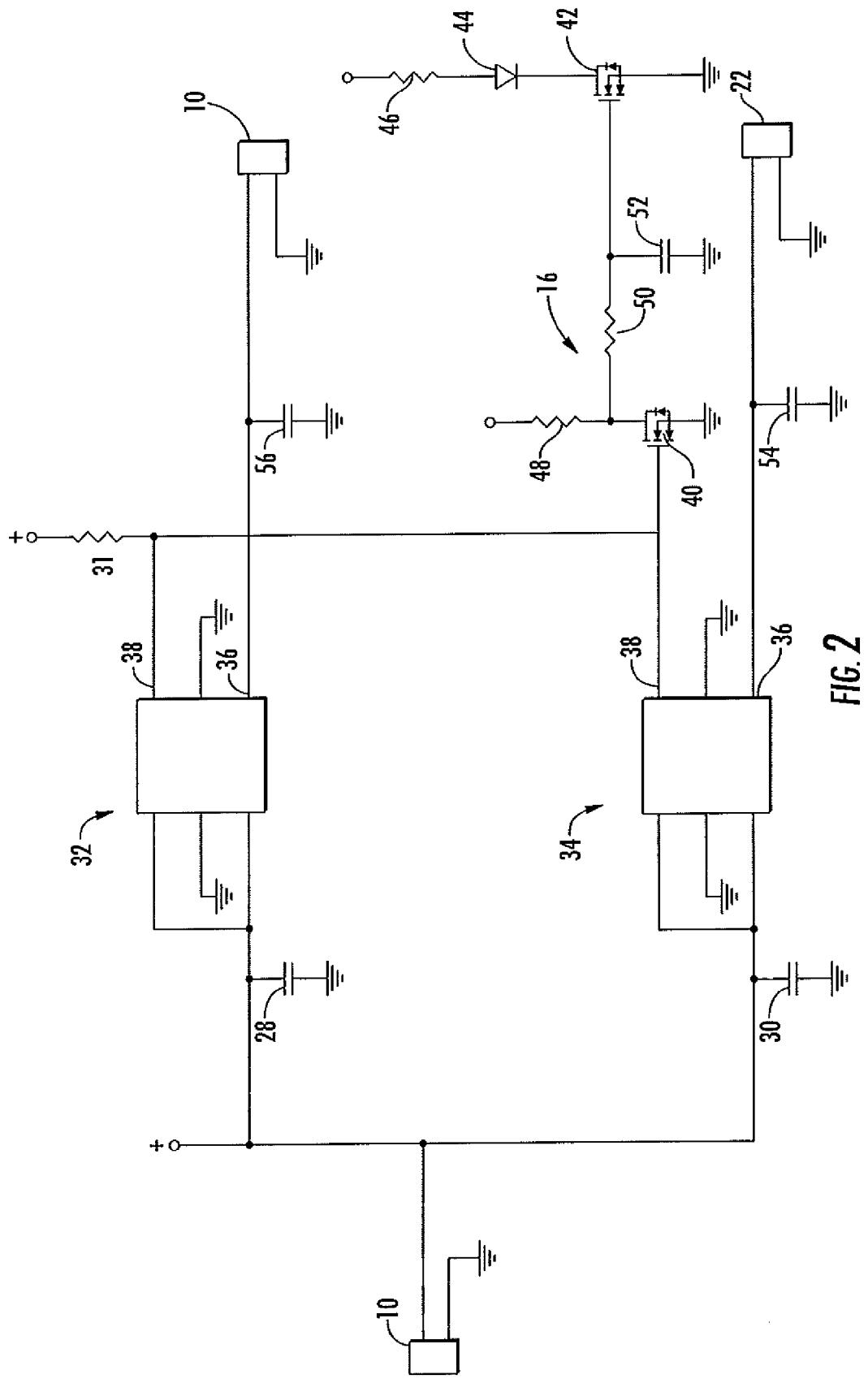
FIG. 2 is a schematic diagram of the IC elements used to charge the lithium batteries as shown in FIG. 1.

FIG. 2 is a more detailed schematic diagram showing electronic components of the block circuit shown in FIG. 1.

DC input power is provided at AC/DC converter and is shown in FIG. 2 as the sign +, which is typically +5V. Power passes by capacitors 28 and 30 to assure that the power is clean and free from any transient voltage spikes. Torex components 32 and 34 are integrated Li-ion battery charging IC's. One such IC is Torex XC6801A4PR-G. The purpose of these devices is to monitor the state of the insole batteries located off the PCB and in the heated insole itself. Both IC's 32 and 34 are smart devices that look at the charging characteristics of each battery and adjust their output voltage to match a current profile matched to the battery chemistry and capacity of the battery. This output is pin 36 of IC's 32 and 34, respectively.

Battery status is displayed to the user via pin 38 of IC's 32 and 34, and this pin is an open collector type output and is pulled low during the charge state. Power is supplied through resistor 31 to pin 38. A low level while charging then turns on the P channel FET Q1-B designated as numeral 40 which in turn, turns on the next P channel FETQ1-A designated 42. A low level on Q1-A 42 allows current to flow out from the cathode of LED 44 which illuminates the LED and receives its power through resistor 46.

Both IC's 32 and 34 share this connection to Q1-B 40 as it is important that either charger device 32 or 34 be able to activate the charging LED indicator as either battery may need charging or perhaps only one does. Once both devices determine each battery is fully charged, they present a high level on their output pin 36 which is then pulled to +Power via resistor 46.

A high level on this node then deactivates Q1-B, 40, then Q1-A, 42 such that the current from LED 44 is disrupted, and the LED is extinguished. An extinguished LED signifies charging on both insole batteries is complete.

Components 48, 50 and 52 form an RC time constant such that small pulses that may occur on the outputs of IC's 32 and 34 during charging are ignored and only a DC state will signify a change of LED state.

Capacitors 54 and 56 are DC storage capacitors such that when the charger is not connected to the batteries, the capacitors will be charged via IC's 32 and 34 to the point in which both IC's 32 and 34 think a battery is present and it is fully charged, thus turning off the LED when no battery is connected to the system. This is done since it is desirable for the LED to be in the "off" state when no batteries are connected, in the "on" state when batteries are connected and charging and again in the "off" state when the batteries are fully charged.

Figure 3:
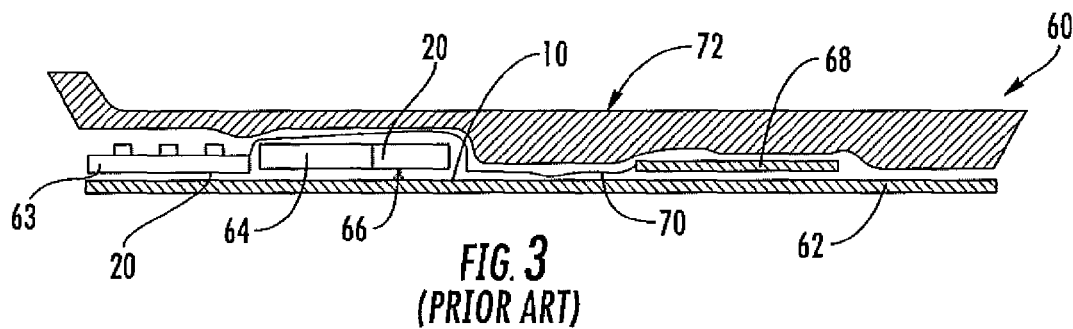
FIG. 3 is a sectional view through the insole of a shoe showing prior art.

FIG. 3 is a sectional view of a prior art insole 60 having a black non-woven bottom layer 62 and an insulating foam layer 72 on which sits a PCB board 63. The PCB board controls heater 68. Prior art IC 64 circuit controls charging battery 20 which, in conjunction with the PCB board circuit 63 controls heater 68 through conductors 70 to heat the insole. The use of a PCB circuit to control the heater 68 is described in U.S. Pat. No. 8,074,373 to Macher, et al., the contents of which are incorporated herein.

While the prior art FIG. 3 is a combined lithium and intelligent circuit (IC) integrated single unit 66 (20 and 64), it is understood that the battery 20 contained within the insole may be separated from the IC circuit 64. The electrical conductors 24 and 26 between the IC circuits and the sockets in the footwear will carry signals to charge the battery 66 and thereby control heater 68 in conjunction with PCB board 63.

The combination of an improved locational assembly for the heater pad within the insole further enhances the general heating capabilities of the present invention and overall efficiency when utilized with the separate IC circuits outside the shoe as shown in FIGS. 1 and 2 above.

The prior art construction in FIG. 3 also has an EVA foam insole member 72 which sits on top of the previously described sole structure so that heat generally emanates upwardly through the foam 72 from heater 68 to the bottom of the sole of the foot (not shown) which rests on top of the EVA foam member 72. The prior art structure foam material is about 5 mm in thickness compressed only a small amount so that about 5 mm is the depth of the layer 72 when the shoe is worn.

Figure 4:
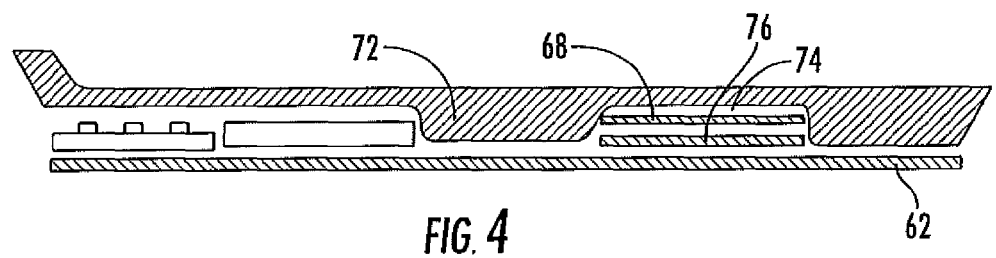
FIG. 4 is another sectional view similar to FIG. 3 but showing the heater more efficiently located to heat the sole of the user.

A first embodiment of an improvement over the prior art is shown in FIG. 4 which enables the heater 68 to be located closer to the sole of the foot which rests on top of foam 72. In this embodiment, a recess 74 is formed EVA foam 72 above heater 68 to minimize the foam just under the sole in the region of the heater 68. The foam 72 is compressed to 2-3 mm and preferably 2 mm. Compressing EVA foam to no more than 3 mm makes it more dense, and it is more thermally conductive than the prior art thereby carrying heat from heater 68 to the foot. Additionally a separate insulation member 76 approximately the size of heater 68 is added between the surface 62 and the heater 68 to ensure heat is directed upwardly. This additional insulation member is able to be added because of the space saved by compressing foam layer 72 to 2-3 mm. Thus, the thickness of foam 72 between the heater 68 and sole of the foot is materially reduced, while insulation 76 below foam 72 reduces the amount of heat lost downwardly from heater 68.

Figure 5:
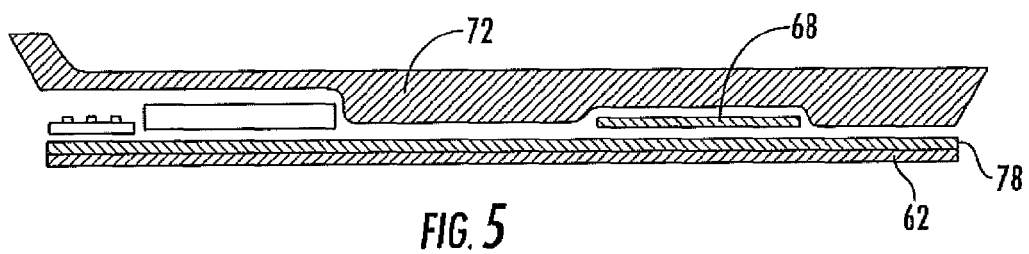
FIG. 5 is also a sectional view of the insole similar to FIG. 4 showing an additional embodiment.

FIG. 5 is another embodiment of the heater pad insole structure which may be provided separately or in conjunction with the embodiment of FIG. 4. An additional layer of insulation 78 is provided on top of the bottom black non-woven layer 62 and below heater 68 to further prevent heat from the heater 68 escaping downwardly to the bottom of the insole. Space is provided for layer 78 which extends substantially the length of the shoe because of the reduced thickness of foam layer 72. In this regard, by further preventing heat from escaping, more heat is directed upwardly toward the foot so as to provide a more efficient insole heating system.

Figure 6:
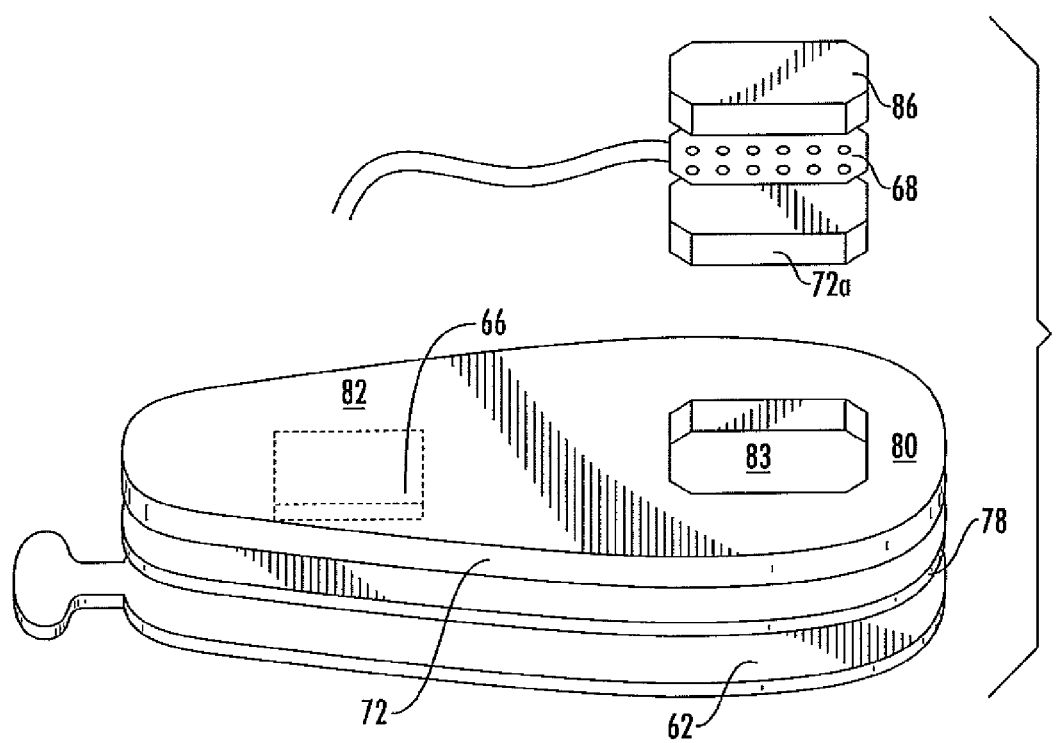
FIG. 6 is a perspective view of another embodiment of the insole structure similar to FIG. 5.

FIG. 6 is a perspective view of yet another embodiment of a system to deliver more heat to the foot in a heated insole. The prior art single EVA foam pad 72 is modified to be formed in two sections, a front section 80 and a rear section 82. Sections 80 and 82 are integral and have a hole or recess 84 located between front and rear sections. A conductive pad 86 fits in the hole 84. Pad 86 is a thermally conductive rubber or rubber like material. It is 1 or 2 mm thick. The heater 68 sits in hole 84 and is under pad 86. A bottom insulation base layer 78 (as in FIG. 5) has heater 68 placed on top of the base layer 78 in the recess 84. Conductive pad material 86 is located on top of heater 68 so that heat from the heater is directly carried to the sole of the foot, and heat loss escaping downwardly from heater 68 is prevented by insulation layer 78. This structure allows more heat to be directed upwardly toward the bottom of the sole in a more efficient manner thereby reducing power drain of battery 66. Foam 72 includes a small section labeled 72a in FIG. 6.

A preferred embodiment of this invention locates the heater 68 within 2 mm of the foot side of the insole.

A more consumer friendly product may be provided by having a turbo mode which provides an initial burst of high heat when the heater 68 is initially turned on. Further, the turbo mode may be repeatedly activated either manually by the user or automatically within the system. When a remote system is employed to control the heater 68, the remote transmitter, when activated, may initiate the turbo mode for the system.

As a further improvement, the electrical system on the PCB board may also include cycling the heat controls between high and low heat to more efficiently utilize energy and maximize comfort for the user.

With regard to improving the thermal conductivity of the foam EVA layer, one might compress the foam to make it more dense to improve thermal conductivity or use a solid plastic instead of foam to both provide insulation and thermal conductivity so that heat is more efficiently directed to the bottom of the foot of the wearer.

This invention has been described with regard to improving the overall efficiency, safety and economics of providing a heated insole for primarily outdoor shoe wear. One aspect of the invention is to improve the delivery of heat to the foot of the wearer so as to lessen wasted heat and more efficiently utilize the heating pads' output. This reduces power consumption and generally improves the life of the heating unit and battery run times.

In addition, an important aspect of the present invention is minimizing waste by separating the intelligent circuit from the lithium battery, which is different from that of the prior art in which such elements are combined as a single unit within the insole. By separating the IC circuit from the battery, significant improvements are obtained for the system.

IC charging functions, other than simply making the electrical connection to the batteries, are carried out outside of the insoles. The electronic components that have the intelligence to determine the state of charge of the batteries and respond with the correct voltage and current to fully and quickly charge them are located in the power supply that plugs into the wall receptacle or in the cables between the power supply and the batteries.

The advantages of such system are:
Removing the charging components from the insole where they are subjected to heat buildup and the repeated mechanical stress of walking means chargers will last longer.
Charger circuit failures can be remedied by replacing the charger alone, not the entire product.
Fewer electronic components within the insole structure man that the insoles will last longer.
Easier to upgrade, faster, longer lasting charge, etc. which can be implemented by changing the charger. Previously, the entire product including two insoles and charger power supply required upgrading.
Improved energy efficiency: one LED indicated charging status and this LED is off when the insoles are not charging.
Larger charger PCB area allows for better ESD (electrostatic discharge) protection and isolation.
External chargers may be modified for various AC and DC input voltages for greater worldwide usage.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A system for charging an internal battery disposed within an insole of a shoe, the system comprising:
a socket in electrical communication with the internal battery of the insole;
an external intelligent circuit located outside of the insole and the shoe, the external intelligent circuit for controlling charging of the internal battery by monitoring the internal battery state of charge and adjusting a voltage delivered to the internal battery based on the internal battery state of charge, the external intelligent circuit comprising an electrical conductor that plugs into the socket for carrying the voltage to said battery; and
wherein the insole comprises a heater disposed between a top insulating layer and a bottom layer of the insole, the top insulating layer configured to contact a user's foot and the bottom layer configured to rest against an inner sole of the shoe.

2. The system of claim 1, wherein the electrical conductor carries monitoring information from said battery to said external intelligent circuit.

3. The system of claim 1, wherein a DC input voltage to the external intelligent circuit is generated by an AC to DC converter that is electrically coupled to the external intelligent circuit.

4. The system of claim 1, wherein the external intelligent circuit comprises a second electrical conductor that electrically couples with a second socket of another insole.

5. The system of claim 1, further comprising an LED to indicate when said battery needs charging.

6. The system of claim 1, wherein the insole further comprises a foam insert between the heater and the bottom layer.

7. The system of claim 1, wherein the top insulating layer is compressible by about 2 mm to 3 mm.

8. The system of claim 1, wherein the top insulating layer defines a first recess configured to house the heater.

9. The system of claim 1, further comprising a separate insulating layer of the insole that is adjacent to and extending the length of the bottom layer of the insole.

10. The system of claim 9, wherein the heater is located between the separate insulating layer and the top insulating layer of the insole.

11. The system of claim 1, wherein said top insulating layer of the insole defines a second recess configured to house the internal battery.

12. The system of claim 11, further comprising a heater circuit housed in the second recess and operably coupled to the internal battery and the heater.

13. The system of claim 12, wherein the heater circuit controls heating of the heater.

14. The system of claim 13, wherein the heater circuit is coupled to the heater by internal conductors.

* * * * *